(12) United States Patent
Hori et al.

(10) Patent No.: US 6,516,686 B1
(45) Date of Patent: Feb. 11, 2003

(54) MOTIVE-POWER TRANSMISSION DEVICE FOR VEHICLE

(75) Inventors: Yoshiaki Hori; Takashi Shichinohe; Tohru Nishi; Noriaki Takano, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/685,646

(22) Filed: Oct. 5, 2000

(30) Foreign Application Priority Data

Oct. 5, 1999 (JP) .......................................... 11-284208

(51) Int. Cl.[7] ............................................. F16H 47/00
(52) U.S. Cl. ..................................................... 74/730.1
(58) Field of Search ......................................... 74/730.1

(56) References Cited

U.S. PATENT DOCUMENTS 3,401,763 A * 9/1968 Rolt ............................ 74/730.1
3,628,619 A * 12/1971 Tanaka et al. ............. 74/730.1
4,630,507 A   12/1986 Kugler et al.

FOREIGN PATENT DOCUMENTS

JP        47-40717     12/1972
JP        11-190425    7/1999

* cited by examiner

*Primary Examiner*—Dirk Wright
(74) *Attorney, Agent, or Firm*—Birch, Stewart, Kolasch & Birch, LLP

(57) ABSTRACT

To provide a motive-power transmission device for a vehicle including a torque converter, a gearbox, and a clutch for cutting off the transmission of motive power between the input shaft of the gearbox and the turbine of the torque converter. The gearbox is accommodated in the crankcase, and the motive-power transmission device is compact in the axial direction of the crankshaft. A motive-power transmission device for a vehicle includes the crankshaft and the input shaft of the gearbox journaled freely rotatably in the crankcase, their axes being parallel to each other; the torque converter is mounted on one end portion of the crankshaft; and the clutch is separated along the axial direction of the crankshaft from the torque converter and so mounted on one end portion of the input shaft that part of the clutch overlaps the torque converter as seen in the axial direction of the crankshaft.

22 Claims, 10 Drawing Sheets

MOTIVE-POWER TRANSMISSION DEVICE FOR VEHICLE

BACKGROUND OF THE INVENTION

1. Field of the Invention

The present invention relates to a motive-power transmission device for a vehicle comprising a torque converter having a pump which rotates as a unit with the crankshaft of an engine, a gearbox wherein one of gear trains is selected and put into operation, and a clutch for cutting off the transmission of motive power between the input shaft of the gearbox and the turbine of the torque converter.

2. Description of the Related Art

Such motive-power transmission devices have been known to date as is disclosed in the Japanese Unexamined Patent Publication No. S47-40717.

In the motive-power transmission device of the above related art, the crankshaft and the input shaft of the gearbox are aligned with each other, and the torque converter, the clutch, and the gearbox are arranged in line. Such arrangement is preferable in case of a motive-power transmission device wherein the gearbox case is separate from the crankcase of the engine. However, if such arrangement is adopted for a motive-power transmission device wherein the gearbox is accommodated in the crankcase of the engine, the motive-power transmission device becomes large along the axial direction of the crankshaft and hence unsuitable for installation in relatively small vehicles. In case of an all terrain vehicle of a saddle type in particular, the distance between the right and left footrests becomes large, spoiling the riding posture if the axis of the crankshaft is disposed in the lateral direction of the vehicle. If the axis of the crankshaft is disposed in the longitudinal direction of the vehicle, the center of gravity of the vehicle moves forward, increasing the load on the front wheels and hence the steering force required of the rider.

SUMMARY OF THE INVENTION

In accordance with the above, an object of the present invention is to provide a motive-power transmission device wherein the gearbox is accommodated in the crankcase and which is compact in the axial direction of the crankshaft.

According to a first aspect of the present invention, there is provided a motive-power transmission device for a vehicle comprising a torque converter having a pump which rotates as a unit with the crankshaft of an engine, a gearbox wherein one of gear trains is chosen and put into operation, and a clutch for cutting off the transmission of motive power between the input shaft of the gearbox and the turbine of the torque converter. The crankshaft and the input shaft are journaled freely rotatably in the crankcase of the engine, and their axes are parallel to each other. The torque converter is mounted on one end portion of the crankshaft. The clutch is separated along the axial direction of the crankshaft from the torque converter and so mounted on one end portion of the input shaft that part of the clutch overlaps the torque converter as seen in the axial direction of the crankshaft.

In accordance with the first aspect of the present invention, the motive-power transmission device wherein the gearbox is accommodated in the crankcase can be made compact in the axial direction of the crankshaft because the torque converter and the clutch are mounted on the crankshaft and the input shaft, respectively, which are parallel to each other. In addition, because the clutch can be disposed close to the crankshaft, the motive-power transmission device is made compact in the direction orthogonal to the axis of the crankshaft.

According to a second aspect of the present invention, there is provided the motive-power transmission device of the first aspect of the present invention, wherein: the torque converter is mounted on one end portion of the crankshaft which protrudes from the crankcase; mounted on one end portion of the input shaft protruding from the crankcase is the clutch which is operated by oil pressure and disposed between the torque converter and the crankcase; and an oil feed pipe, which extends coaxially with the input shaft, by the torque converter and feeds oil to the clutch, is provided between one end portion of the input shaft and a cover which covers the torque converter and the clutch and is joined to the crankcase. Thus, the space by the torque converter is made use of to constitute the hydraulic-oil feed system for the clutch.

According to a third aspect of the present invention, there is provided the motive-power transmission device of the second aspect of the present invention, wherein a control valve for the clutch for controlling the oil pressure to act on the clutch is connected to the oil feed pipe and mounted on the cover. Thus, the clutch and the control valve for the clutch can be arranged close to each other and, thereby, an excellent responsiveness of the clutch to the workings of the control valve can be achieved.

According to a fourth aspect of the present invention, there is provided the motive-power transmission device of the second or third aspects of the present invention, wherein the clutch comprises: a clutch center which is coupled with a driven gear and rotates about the axis of the input shaft; the driven gear engaging a driving gear which rotates as a unit with the turbine of the torque converter; at least one first clutch plate which engages the outer periphery of the clutch center so as to prohibit the relative rotation between itself and the clutch center; at least one second clutch plate which is disposed so as to overlap the first clutch plate; a clutch drum which accommodates the first and second clutch plates, engages the outer periphery of the second clutch plate to prohibit the relative rotation between itself and the plate, and rotates with the input shaft as a unit; and a piston which is fitted in the clutch drum so as to be freely slidable to cause frictional engagement between the first and second clutch plates. Thus, the clutch having the relatively large clutch drum can effectively be disposed along the axis of the crankshaft, near the torque converter, without causing the clutch drum to interfere with the crankshaft.

According to a fifth aspect of the present invention, there is provided the motive-power transmission device of the fourth aspect of the present invention, wherein a first one-way clutch for transmitting the motive power from the input shaft to the clutch center is provided between the clutch center and the input shaft. Thus, the motive power of the gearbox can be transmitted to the torque converter when the engine brake is applied.

According to a sixth aspect of the present invention, there is provided the motive-power transmission device of the fourth or fifth aspects of the present invention, wherein: a second one-way clutch for allowing a stator of the torque converter to rotate in one direction is provided between the stator and the crankcase; the driving gear is disposed between the second one-way clutch and the torque converter, along the axial direction of the crankshaft; and the clutch is mounted on one end portion of the input shaft so that at least part of the clutch drum takes a position along the axial direction of the crankshaft and by and adjacent to the second one-way clutch. Thus, the efficiency of the torque converter can be improved by having the second one-way clutch allow the stator to rotate idly. Besides, the second one-way clutch with a relatively small diameter can effectively be disposed in the space between the clutch drum and the crankshaft, positionally corresponding to at least part of the clutch drum.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Referring to the attached drawings, embodiments of the present invention will be described.

Figure 1:
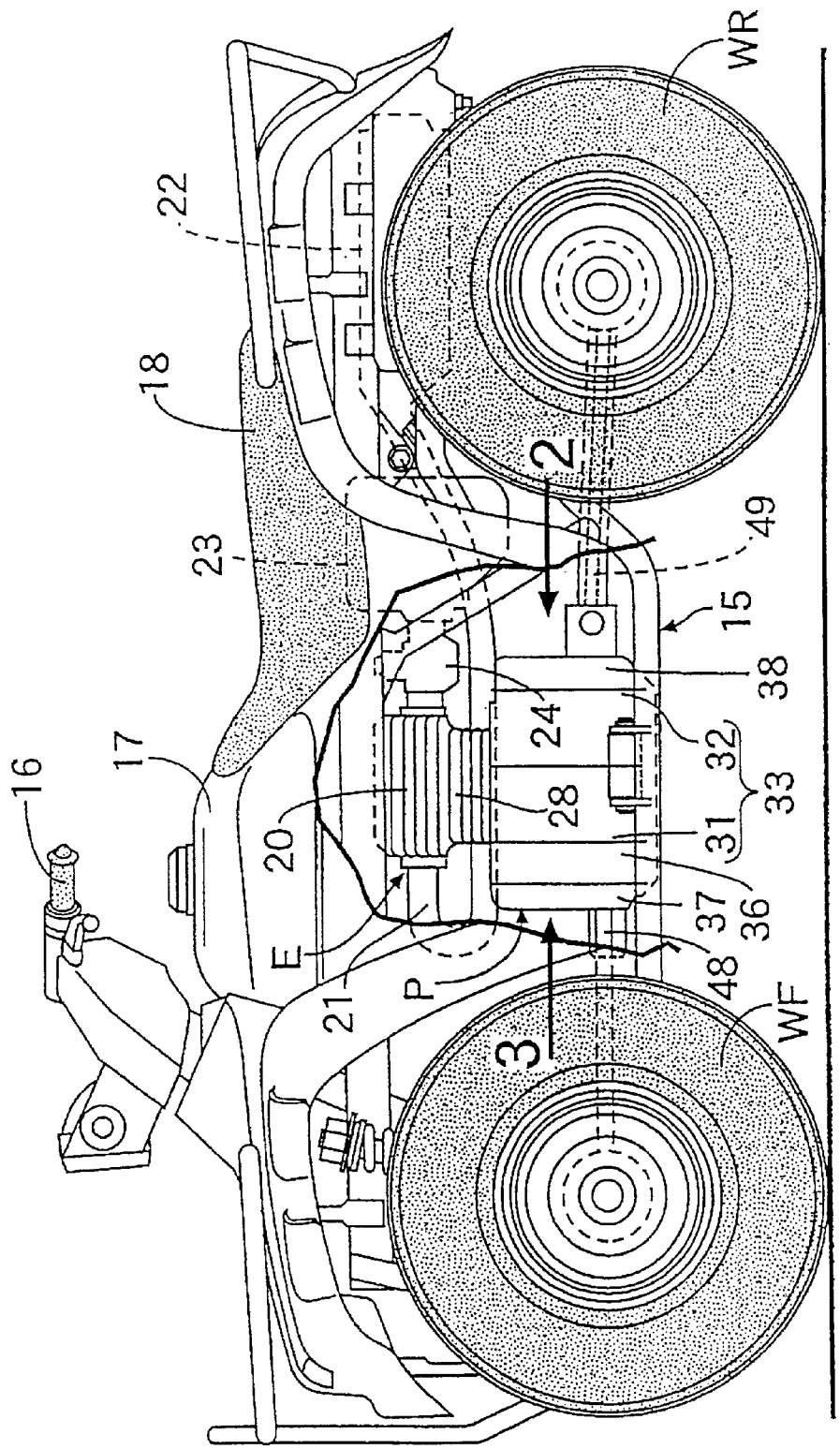
FIG. 1 is a side view of an all terrain vehicle equipped with the power unit of the first embodiment of the present invention.
Figure 2:
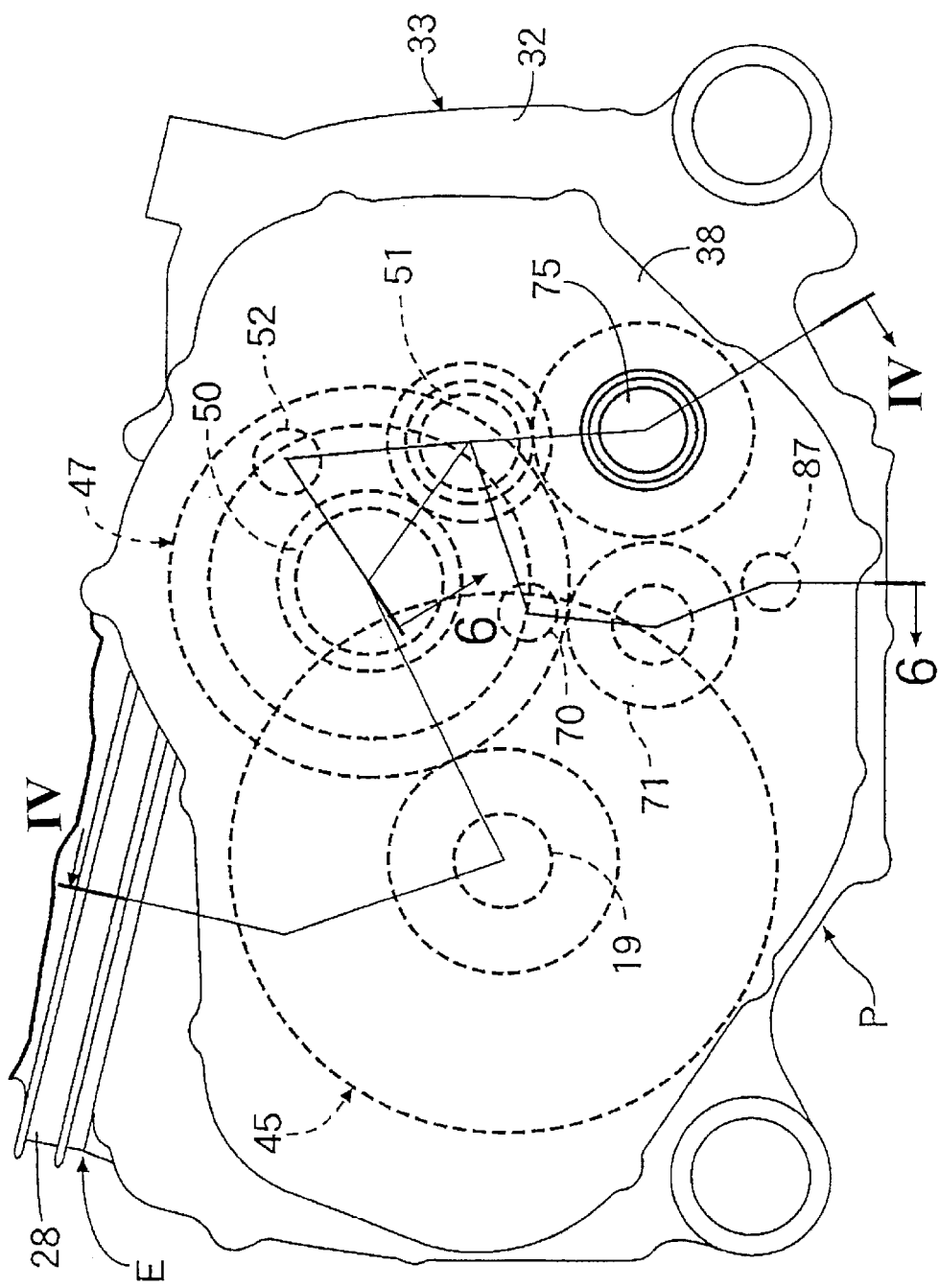
FIG. 2 is an enlarged, simplified view of the power unit as seen in the direction of arrow 2 of FIG. 1.
Figure 3:
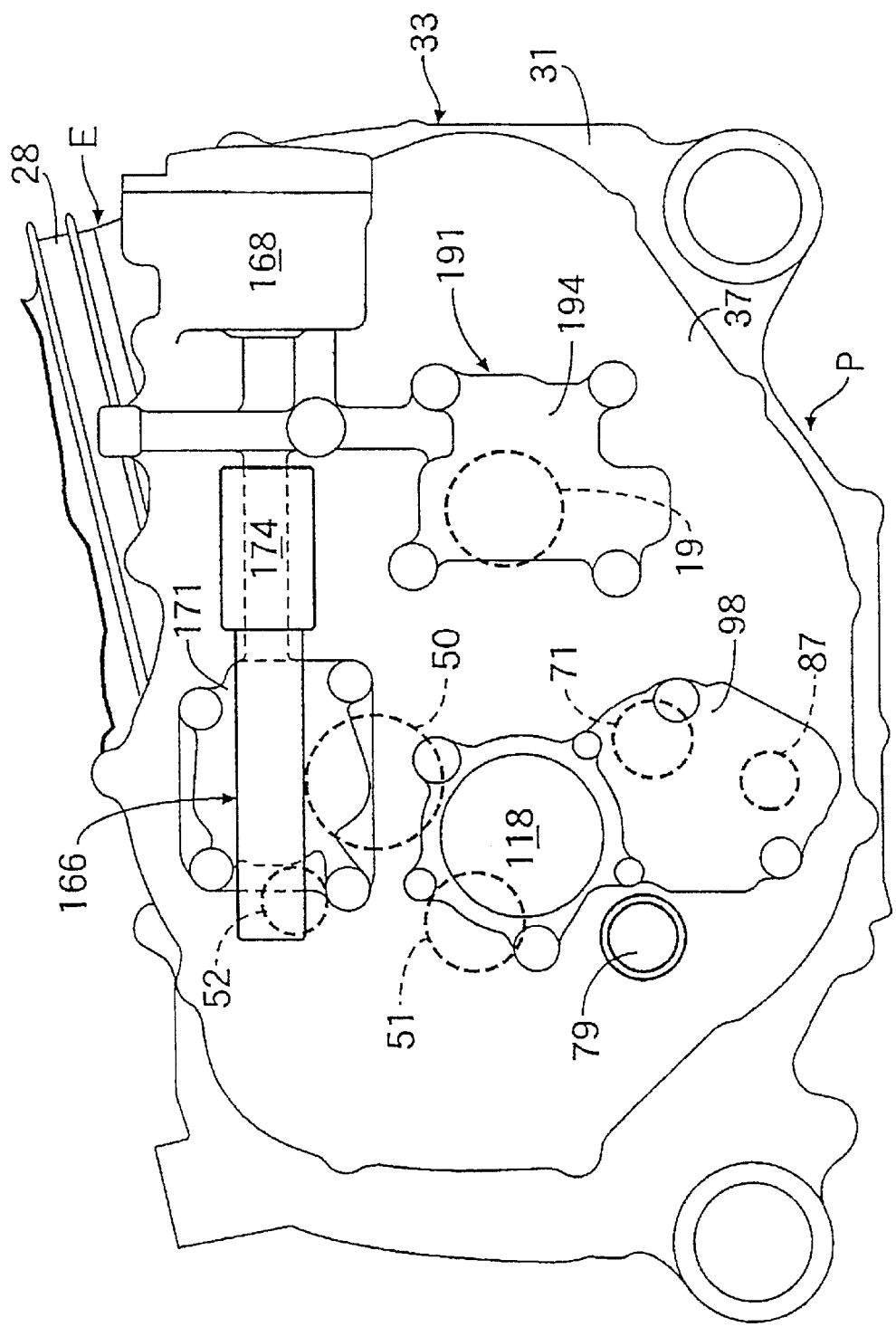
FIG. 3 is an enlarged, simplified view of the power unit as seen in the direction of arrow 3 of FIG. 1.
Figure 4:
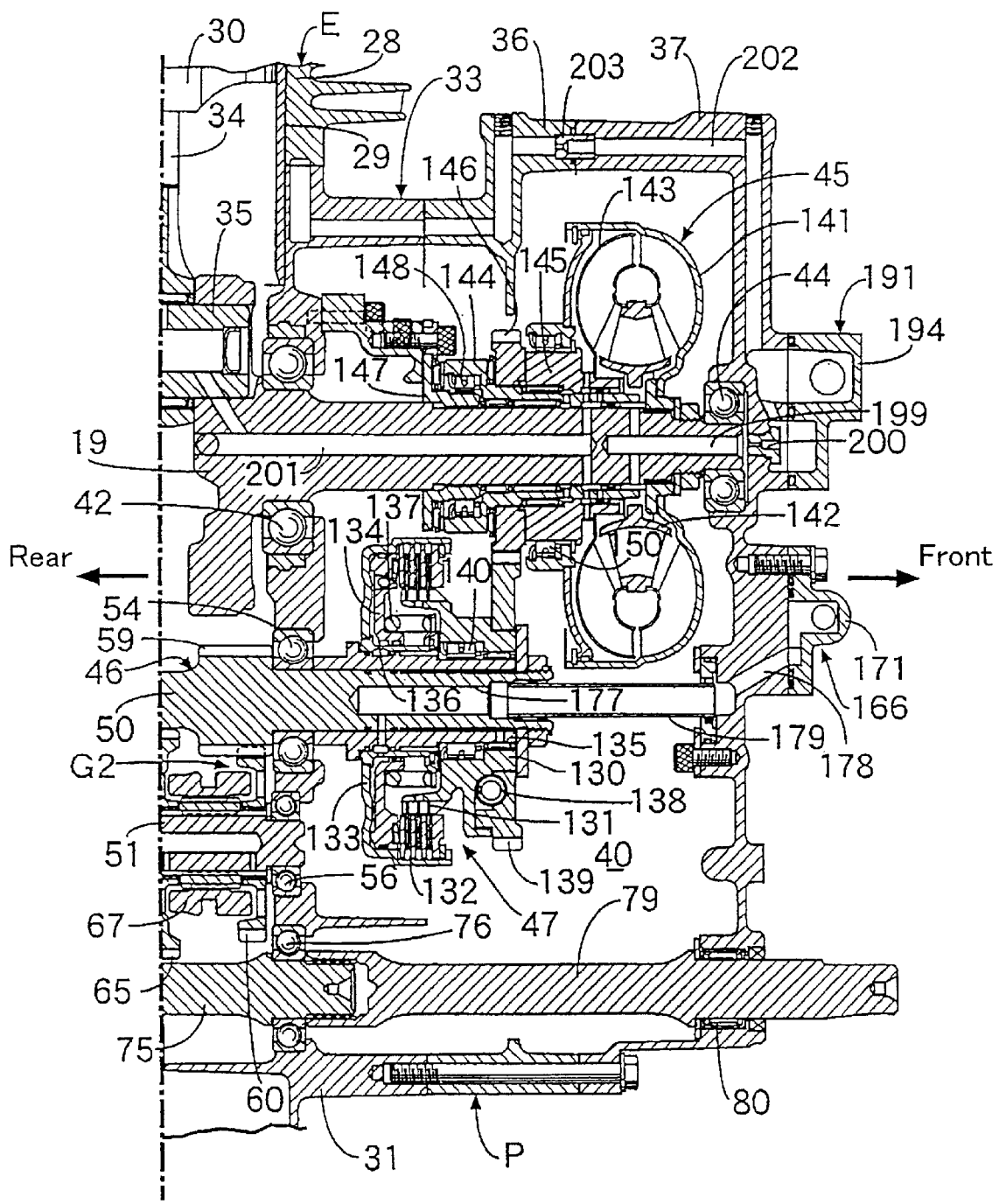
FIG. 4 shows the front half of the section along line IV—IV of FIG. 2.
Figure 5:
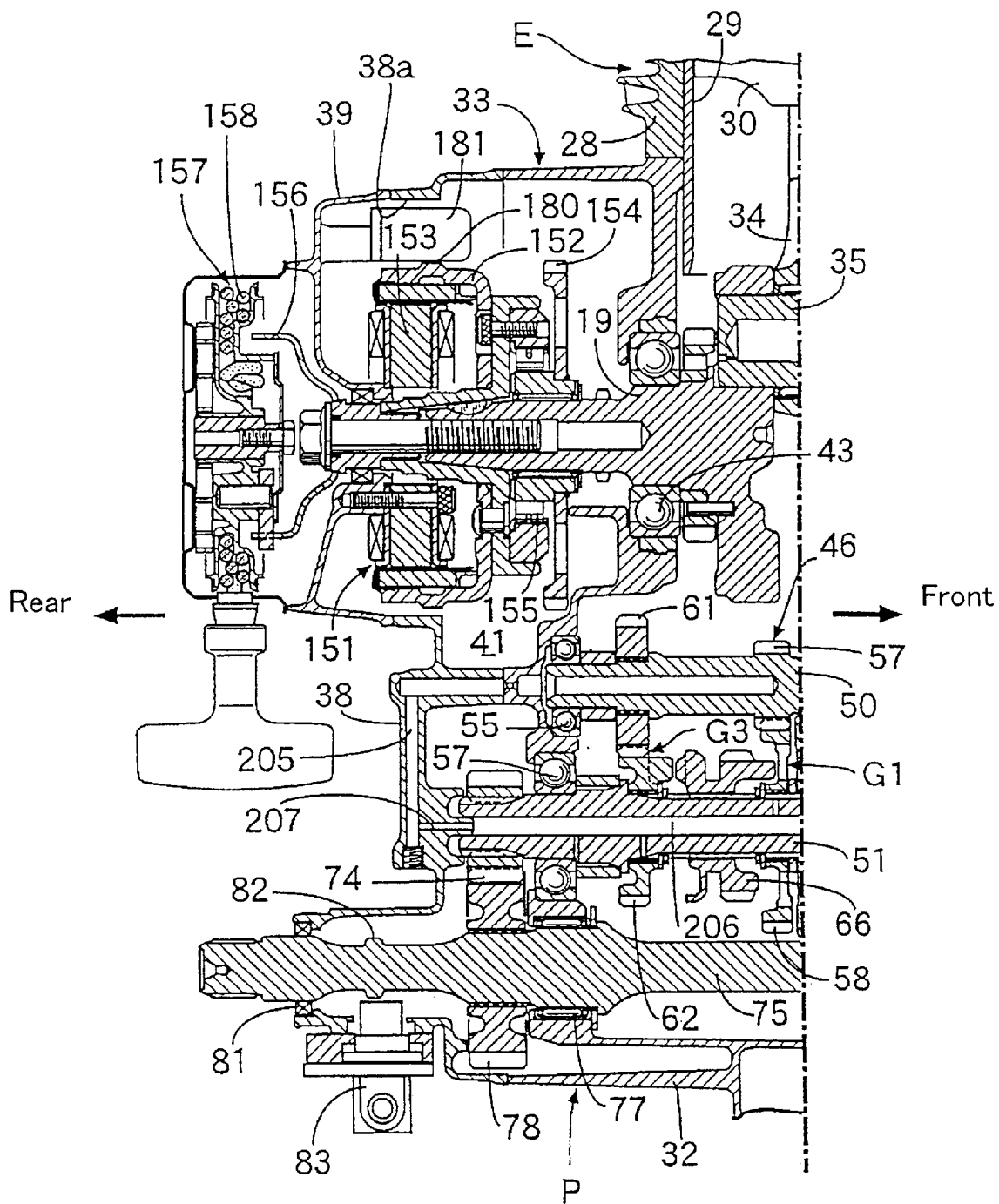
FIG. 5 shows the rear half of the section along line IV—IV of FIG. 2.
Figure 6:
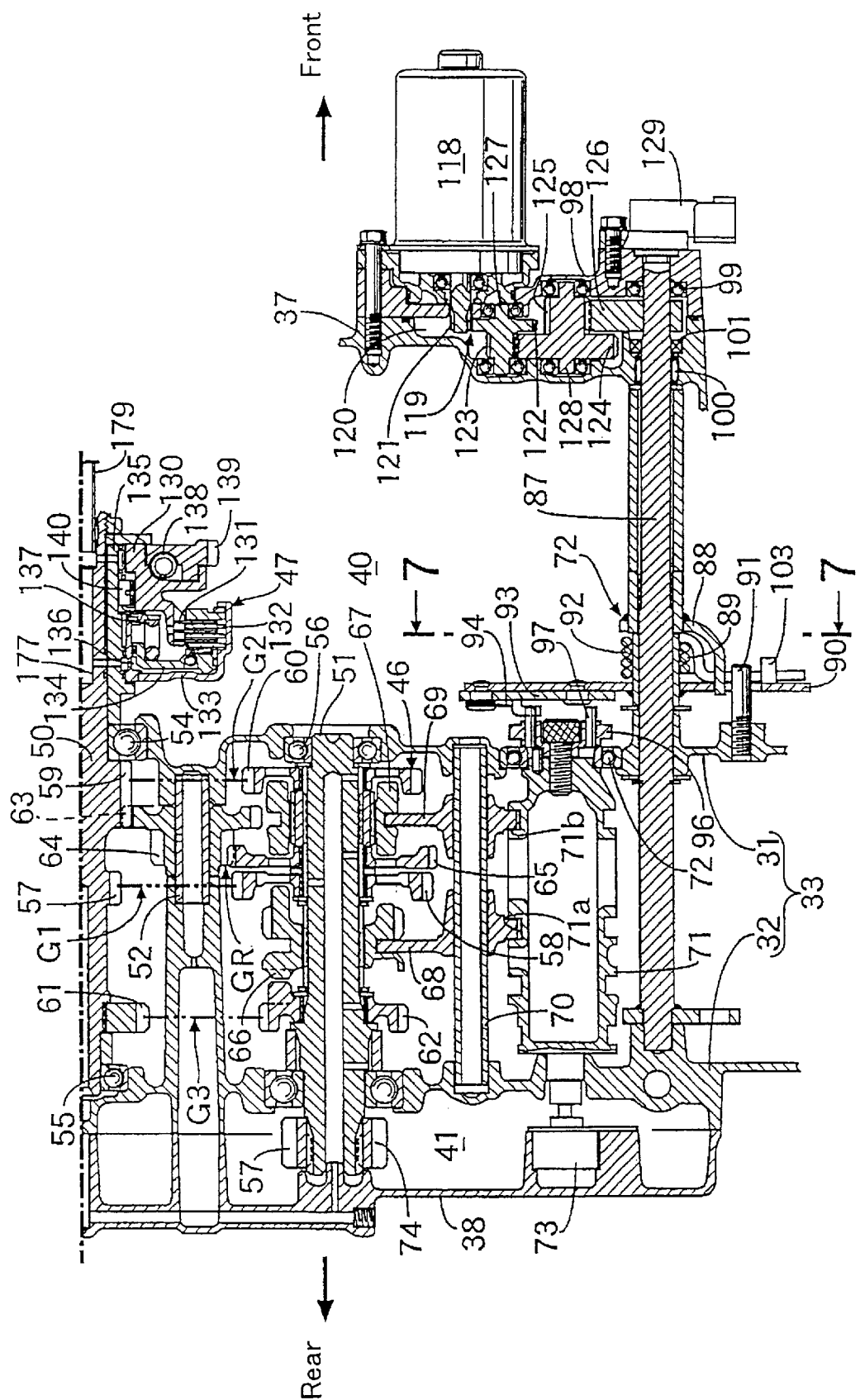
FIG. 6 is a sectional view taken along line 6—6 of FIG. 2.
Figure 7:
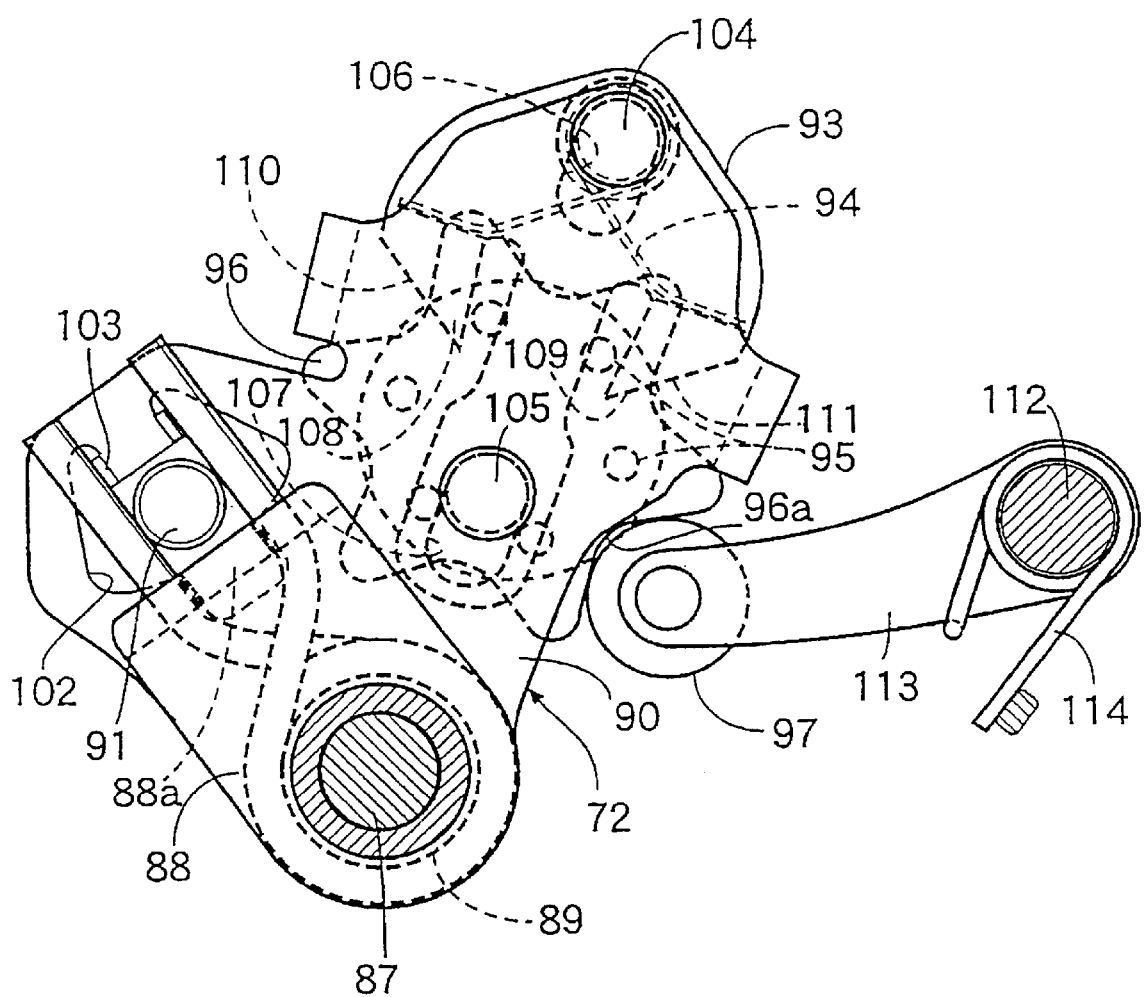
FIG. 7 is an enlarged sectional view taken along line 7—7 of FIG. 6.
Figure 8:
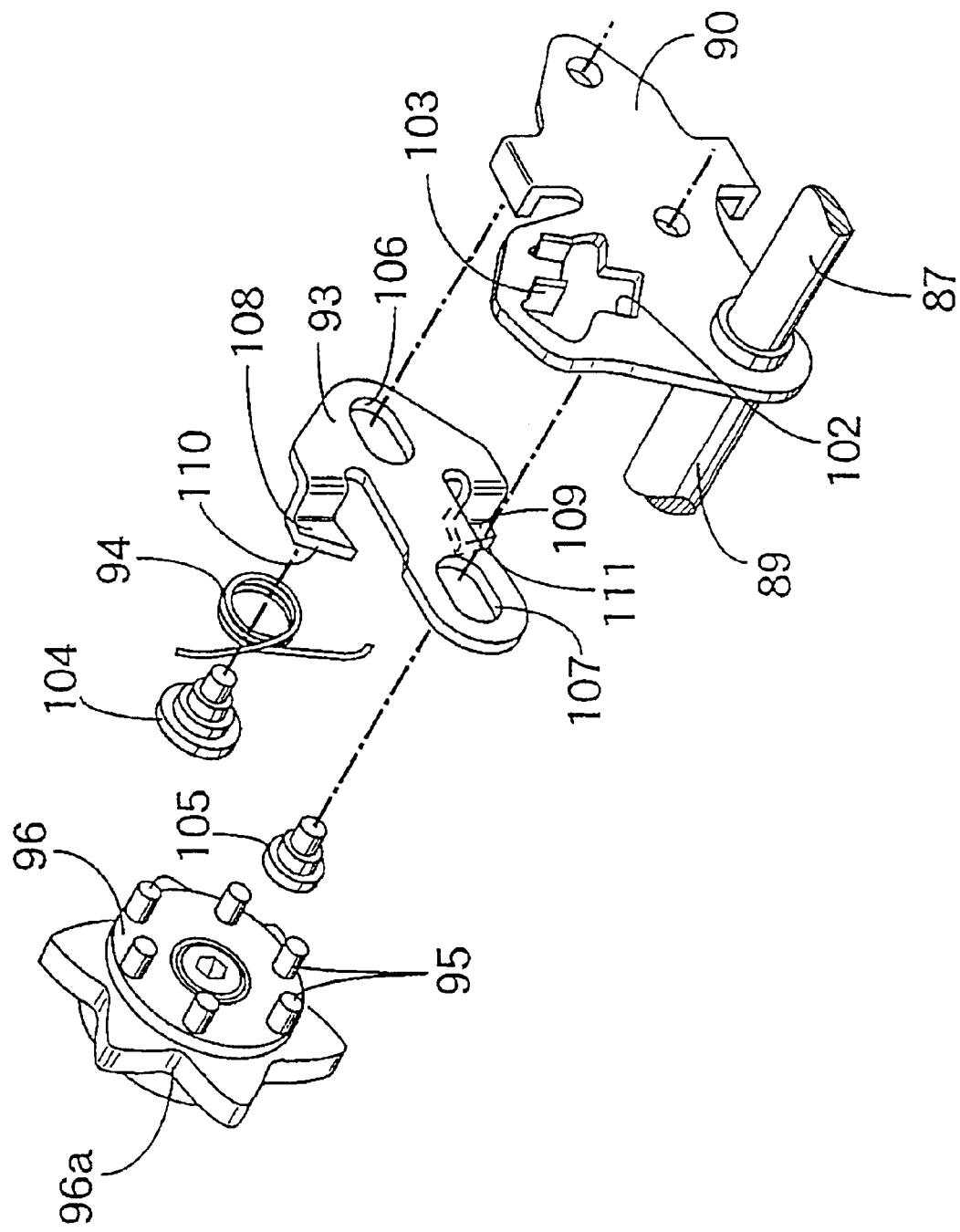
FIG. 8 is an exploded perspective view of a part of the gear shift mechanism of the power unit of FIG. 1.
Figure 9:
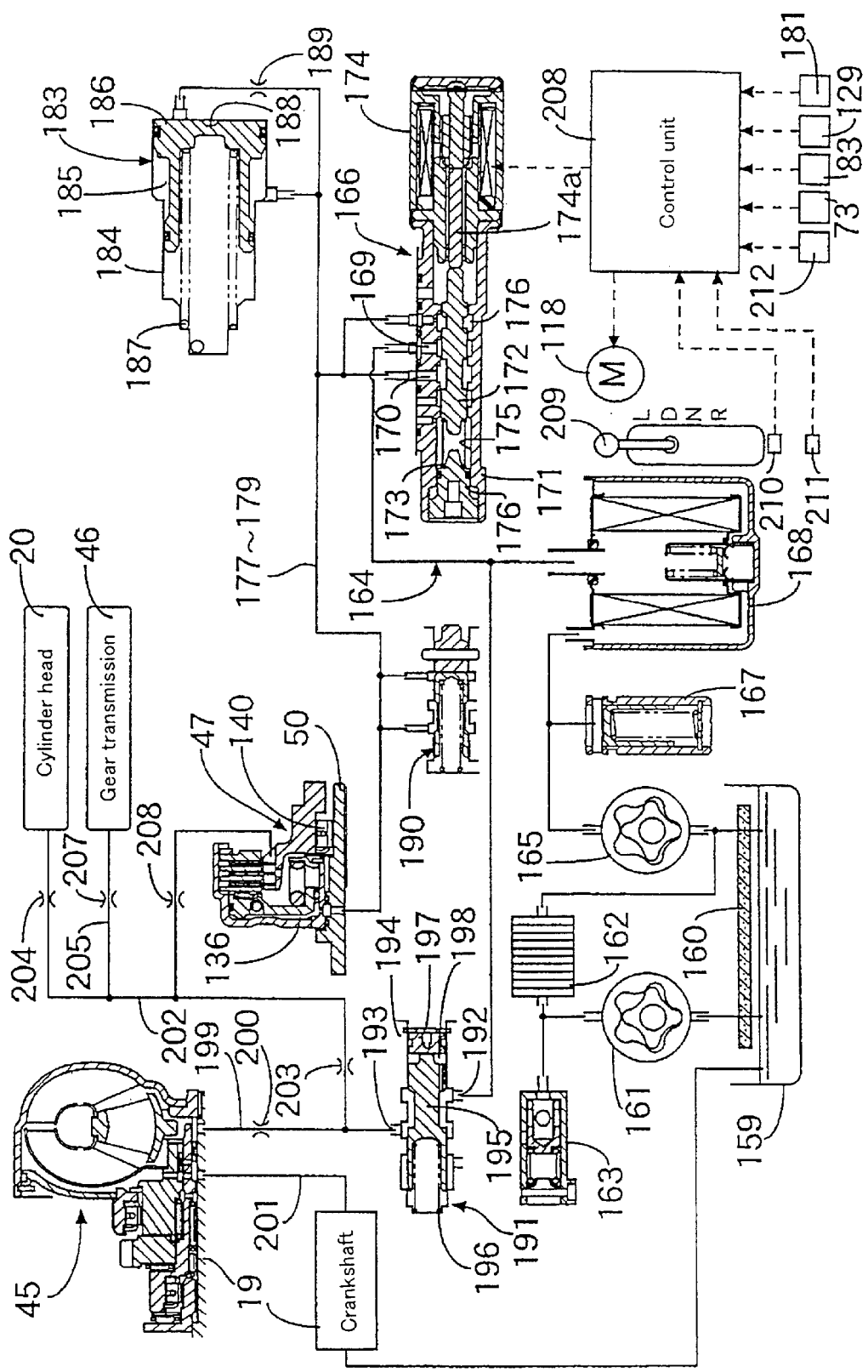
FIG. 9 is an oil-hydraulic circuit of the power unit of FIG. 1.

FIGS. 1 to 9 show the first embodiment of the present invention. FIG. 1 is a side view of an all terrain vehicle of a saddle type. FIG. 2 is an enlarged, simplified view of the power unit as seen in the direction of arrow 2 of FIG. 1. FIG. 3 is an enlarged, simplified view of the power unit as seen in the direction of arrow 3 of FIG. 1. FIG. 4 shows the front half of the section along line IV—IV of FIG. 2; FIG. 5, the rear half. FIG. 6 is a sectional view taken along line 6—6 of FIG. 2. FIG. 7 is an enlarged sectional view taken along line 7—7 of FIG. 6. FIG. 8 is an exploded perspective view of a part of the gear shift mechanism of the power unit. FIG. 9 is an oil-hydraulic circuit of the power unit.

As shown in FIG. 1, the all terrain vehicle has a frame 15, which is made of welded pipes. A pair of front wheels WF, each fitted with a balloon tire, is suspended from the front portion of the frame 15. A pair of rear wheels WR, each fitted with a balloon tire, is suspended from the rear portion of the frame 15. The front end of the frame 15 is provided with handlebars 16 to control the direction of the front wheels WF. A fuel tank 17 is mounted on the middle portion of the frame 15, and a saddle-type seat 18 is mounted on the frame 15, behind the fuel tank 17.

Mounted in the frame 15, below the fuel tank 17 and the seat 18 is a power unit P, which includes an engine E to drive the driving and steering front wheels WF and the driving rear wheels WR. The engine E is disposed, for example, vertically, its crankshaft 19 (refer to FIGS. 2 to 6) lying in the longitudinal direction of the all terrain vehicle. An exhaust pipe 21, which is connected to an exhaust port (not shown) made in the front of the cylinder head 20 of the engine E, curves right (as seen from behind the vehicle) and then back by 180° and extends by the power unit P to connect with an exhaust muffler 22, which is disposed to the right rear of the frame 15.

An air cleaner 23 and a carburetor 24 connected to it are disposed under the seat 18, behind the engine E. The carburetor 24 is connected to an intake port (not shown) made in the back of the cylinder head 20.

Referring to FIGS. 2 to 5, the cylinder block 28 of the engine E is almost vertical, slightly inclining to the right of the vehicle body, and the cylinder head 20 is joined to the top of the cylinder block 28. The cylinder block 28 has a cylinder liner 29, and a piston 30 is fitted into the cylinder liner 29 so as to be freely slidable.

A crankcase 33 comprising a front half 31 and a rear half 32 is joined to the bottom of the cylinder block 28, the bottom portion of the cylinder liner 29 protruding into the crankcase 33. The crankshaft 19, of which the axis lies in the longitudinal direction of the all terrain vehicle, is journaled in the crankcase 33 so as to be freely rotatable. The piston 30 is connected to the crankshaft 19 through the medium of a connecting rod 34 and a piston pin 35.

Joined to the front crankcase half 31 is a cylindrical front casing 36 extending forward and a front cover 37 for closing a front-end aperture of the front casing 36. A front chamber 40 is formed between the front crankcase half 31 and the front casing 36 with the front cover 37. A rear casing 38 is joined to the rear crankcase half 32, both forming a rear chamber 41 therebetween. An aperture 38a is made in such a portion of the rear casing 38 as corresponds to the crankshaft 19. A rear cover 39 is joined to the rear casing 38 to cover the aperture 38a.

A ball bearing 42 is provided between the crankshaft 19 and the front crankcase half 31, and a ball bearing 43 is provided between the crankshaft 19 and rear crankcase half 32. The front end of the crankshaft 19 protruding from inside the front crankcase half 31 into the front chamber 40 is journaled in a ball bearing 44 supported rotatably by the front cover 37.

The power unit P comprises the engine E, a torque converter 45 mounted on the crankshaft 19 of the engine E, a gearbox 46 wherein one of gear trains G1, G2, G3, and GR is selected and put into operation, and an oil-hydraulic clutch 47 for cutting off the transmission of motive power between the gearbox 46 and the torque converter 45. The power outputted from the gearbox 46 is transmitted to the front right and left wheels WF through a front propeller shaft 48, extending forward from the power unit P, and a front differential gear (not shown) and, at the same time, to the rear right and left wheels WR through a rear propeller shaft 49, extending backward from the power unit P, and a rear differential gear (not shown).

Referring to FIGS. 2 to 6, the gearbox 46 has an input shaft 50 and an output shaft 51, each disposed in parallel with the axis of the crankshaft 19 and journaled in the crankcase 33 freely rotatably, and a countershaft 52 disposed in parallel with the axis of the crankshaft 19 and supported fixedly in crankcase 33.

A ball bearing 54 is provided between the input shaft 50 and the front crankcase half 31, and a ball bearing 55 is provided between the input shaft 50 and the rear crankcase half 32. The front end of the input shaft 50 protrudes from the front crankcase half 31 into the front chamber 40. A ball bearing 56 is provided between the output shaft 51 and the front crankcase half 31, and a ball bearing 57 is provided between the output shaft 51 and the rear crankcase half 32. The rear end of the output shaft 51 protrudes from the rear crankcase half 32 into the rear chamber 41.

The gear trains G1, G2, G3, and GR of the gearbox 46 are accommodated in the crankcase 33. The first-speed gear train G1 comprises a driving gear 57, which is formed together with the input shaft 50 as a single piece, and a driven gear 58, which is journaled on the output shaft 51 so as to be rotatable relatively to the output shaft 51 and engages the driving gear 57. The second-speed gear train G2 comprises a driving gear 59, which is formed together with the input shaft 50 as a single piece, and a driven gear 60, which is journaled on the output shaft 51 so as to be rotatable relatively to the output shaft 51 and engages the driving gear 59. The third-speed gear train G3 comprises a driving gear 61, which is fixed onto the input shaft 50, and a driven gear 62, which is journaled on the output shaft 51 so as to be rotatable relatively to the output shaft 51 and engages the driving gear 61. The reverse gear train GR comprises the driving gear 59, a first intermediate gear 63 journaled on the countershaft 52 and engaging the driving gear 59, a second intermediate gear 64 formed together with the first intermediate gear 63 as a piece, and a driven gear 65 journaled on the output shaft 51 so as to be rotatable relatively to the output shaft 51 and engaging the second intermediate gear 64.

A dog clutch member 66 for shifting into first or third is slidably splined to the output shaft 51 between the driven gears 58 and 62 of the first- and third-speed gear trains G1 and G3. The dog clutch member 66 engages the driven gear 58 to put the first-speed gear train G1 into operation or the driven gear 62 to put the third-speed gear train G3 into operation. A dog clutch member 67 for shifting into second or reverse is slidably splined to the countershaft 51 between the driven gears 60 and 65 of the second-speed and reverse gear trains G2 and GR. The dog clutch member 67 engages the driven gear 60 to put the second-speed gear train G2 into operation or the driven gear 65 to put the reverse gear train GR into operation.

A shift fork 68 to hold the dog clutch member 66 for shifting into first or third and a shift fork 69 to hold the dog clutch member 67 for shifting into second or reverse are slidably journaled on a shift-fork shaft 70, which is supported in the crankcase 33 in parallel with the output shaft 51. The shift forks 68 and 69 engage cam grooves 71a and 71b, respectively, formed in the periphery of a shift drum 71.

The front end of the shift drum 71 is journaled in a ball bearing 72 which is supported by the front crankcase half 31. The rear end of the shift drum 71 is directly supported by the rear crankcase half 32. The shift drum 71 is turned by a gear shift mechanism 72 connected to the front end of the shift drum 71. The turn of the shift drum 71 causes the shift forks 68 and 69 to slide and thereby one of the gear trains G1, G2, G3, and GR is chosen and put into operation.

The turned position, or shift position, of the shift drum 71 is detected by a shift-position detector 73 comprising a potentiometer. The shift-position detector 73 is fixed to the rear casing 38 and connected to the rear end of the shift drum 71.

In the rear chamber 41, a driving gear 74 is fixed onto the rear end portion of the output shaft 51. On the other hand, a driving shaft 75 is disposed in parallel with the output shaft 51 and is journaled in a ball bearing 76 supported by the front crankcase half 31 and a roller bearing 77 supported by the rear crankcase half 32 of the crankcase 33. Fixed onto the rear portion of the driving shaft 75 in the rear chamber 41 is a driven gear 78, which engages the driving gear 74.

The front end of the driving shaft 75 protrudes from the front crankcase half 31 into the front chamber 40, and a connecting shaft 79 is coaxially connected to the front end of the driving shaft 75. The connecting shaft 79 is journaled in a roller bearing 80 supported by the front cover 37 so as to protrude forward beyond the front cover 37, and the front propeller shaft 48 is connected to the front end of the connecting shaft 79. The rear end of the driving shaft 75 protrudes backward from the rear casing 38, a seal 81 sealing between the shaft and the casing, and the rear propeller shaft 49 is connected to the rear end of the driving shaft 75.

In the rear chamber 41, a plurality of protrusions 82 are formed on the periphery of the driving shaft 75. Mounted on the rear casing 38 is a speed sensor 83 which senses the movement of the protrusions 82 to determine the rotational speed of the driving shaft 75 and, thereby, the vehicle speed.

Referring to FIGS. 7 and 8, the gear shift mechanism 72 comprises a shift spindle 87 disposed in parallel with the shift drum 71, an arm 88 fixed to the shift spindle 87, a change arm 90 fixed to a collar 89 which is mounted on the shift spindle 87 so as to be rotatable relatively to the spindle, a regulating pin 91 fixed to the front crankcase half 31 and inserted in a hole of the change arm 90, a first torsion coil spring 92 to return the change arm 90 to its neutral position, a shifter plate 93 which is supported by the change arm 90 so as to be movable relatively to the arm in a limited range along the radial direction of the shift spindle 87, a second torsion coil spring 94 to urge the shifter plate 93 radially inwardly of the shift spindle 87, a pin plate 96 which is fixed to the front end of the shift drum 71 to take a position opposite to the shifter plate 93 and on which six feed pins 95 are planted, and a roller 97 which is urged by a spring so as to be in contact with the periphery of the pin plate 96.

The rear end of the shift spindle 87 is journaled in the rear crankcase half 32, and the shift spindle 87 extends freely rotatably through the front crankcase half 31 and further through the front chamber 40. The shift spindle 87 extends still further through the front casing 37, and its front end is journaled in a ball bearing 99 supported by a gear case 98, which is secured to the front casing 37. Besides, the shift spindle 87 is journaled in a roller bearing 100 supported by the front casing 37, and a seal 101 is set between the shift spindle 87 and the front casing 37.

The change arm 90 has an aperture 102 and two spring receivers 103 made by folding up two parts of the edge of the aperture 102. Both end portions of the first torsion coil spring 92 are, where the change arm 90 is in its neutral position, in contact with the spring receivers 103, respectively. Besides, the front end portion 88a of the arm 88 and the regulating pin 91 are inserted in between the end portions of the first torsion coil spring 92 and in the aperture 102.

When the shift spindle 87 turns in a direction while the change arm 90 is in its neutral position, the front end portion 88a of the arm 88 turns, against the force of the first torsion coil spring 92, in the same direction, comes in contact with the right or left edge, as the case may be, of the aperture 102 of the change arm 90, and turns the change arm 90 in the same direction until the opposite edge of the aperture 102 comes in contact with the regulating pin 91. In this state, when the motive power acting on the shift spindle 87 is removed, the first torsion coil spring 92 returns the arm 88 and hence the shift spindle 87, and the arm 90 to their neutral positions.

The change arm 90 has two holes which are disposed along a radial direction of the shift spindle 87 and spaced from each other, and guide pins 104 and 105 are inserted in the holes and fixed in them by caulking. On the other hand, the shifter plate 93 has oval holes 106 and 107, the length, as opposed to the width, of each hole lying along the radial direction, and the guide pins 104 and 105 are let through the holes 106 and 107. Thus, the shifter plate 93 is supported on the surface of the change arm 90, the surface being on the side of the shift drum 71, so as to be slidable in the radial direction of the shift spindle 87.

The shifter plate 93 has at both its sides feed claws 108 and 109 which are folded to the shift drum 71's side. The front ends of the feed claws 108 and 109 are formed into cams 110 and 111.

The second torsion coil spring 94 is supported by the outer guide pin 104. Both the end portions of the second torsion coil spring 94 are put into contact with the feed claws 108 and 109 of the shifter plate 93 to urge the shifter plate 93 radially inwardly of the shift spindle 87.

The pin plate 96 has a star-like shape, having on its periphery six recesses 96a which are disposed at regular intervals. The six feed pins 95 are so planted on the pin plate 96 that two feed pins 95 come between the feed claws 108 and 109 of the shifter plate 93.

An arm 113 is supported at its one end portion by a spindle 112 fixed to the front crankcase half 31 so as to be swingable. The roller 97 is journaled by the other end portion of the arm 113. Set between the front crankcase half 31 and the arm 113 is a third torsion coil spring 114, which urges the arm 113 to put the roller 97 into contact with the periphery of the pin plate 96.

In the above gear shift mechanism 72, when the shift spindle 87 turns in a direction, causing the change arm 90 to turn in the same direction, the left or right feed claw 108 or 109, as the case may be, comes in contact with a feed pin 95 of the shifter plate 93 to turn the shift drum 71 accordingly. For the first torsion coil spring 92 to return the change arm 90 to its neutral position, a feed pin 95 of the pin plate 96 comes in contact with the cam, 110 or 111, of a feed claw 108 or 109, as the case may be, to cause the shifter plate 93 to move radially outwardly of the shift spindle 87 against the force of second torsion coil spring 94 and the feed claw to get over the feed pin 95. The roller 97 engages one of the recesses 86a on the periphery of the pin plate 96 to retain the position after each turn.

Referring to FIG. 6, an electric motor 118 rotatable in two directions is connected to the shift spindle 87 of the gear shift mechanism 72 through a reducing gear train 119.

The electric motor 118 is mounted on the gear case 98 so that the axis of the electric motor 118 is parallel to the shift spindle 87, and the reducing gear train 119 is accommodated in a gear chamber 120 between the front cover 37 and the gear case 98.

The reducing gear train 119 comprises a first reducing gear 121 mounted on the output shaft of the electric motor 118, a second reducing gear 122 engaging the first reducing gear 121, a third reducing gear 123 rotating with the second reducing gear 122 as a unit, a fourth reducing gear 124 engaging the third reducing gear 123, a fifth reducing gear 125 rotating with the fourth reducing gear 124 as a unit, and a sixth reducing gear 126 engaging the fifth reducing gear 125 and rotating together with the shift spindle 87.

The second and third reducing gears 122 and 123 are provided on a first reducing shaft 127 as a unit, the shaft journaled in the front cover 37 and the gear case 98. The fourth and fifth reducing gears 124 and 125 are provided on the second reducing shaft 128, the shaft journaled in the front cover 37 and the gear case 98. The sixth reducing gear 126 is a sector gear and is fixed onto the shift spindle 87.

Mounted on the gear case 98 is a rotational phase sensing means 129 which is a potentiometer and connected is to the front end of the shift spindle 87.

Referring to FIGS. 4 and 6, the oil-hydraulic clutch 47 is mounted on the front end portion of the input shaft 50 protruding from the crankcase 33 into the front chamber 40. The oil-hydraulic clutch 47 comprises: a clutch center 130 rotating about the axis of the input shaft 50; a plurality of first clutch plates 131 engaging the outer periphery of the clutch center 130 so as to prohibit the relative rotation between themselves and the clutch center 130; a plurality of second clutch plates 132 disposed alternately with the first clutch plates 131; a clutch drum 133 accommodating the first and second clutch plates 131 and 132, engaging the outer peripheries of the second clutch plates 132 to prohibit the relative rotation between itself and the plates, and rotating with the input shaft 50 as a unit; and a piston 134 fitted in the clutch drum 133 so as to be freely slidable to cause frictional engagement between the first and second clutch plates 131 and 132.

The front end portion on the periphery of the input shaft 50 is fitted fixedly, coaxially into a sleeve 135. The clutch center 130 is journaled about the sleeve 135 for free relative rotation therebetween. The clutch drum 133 is fixed to the sleeve 135. The piston 134 is fitted into the clutch drum 133 so as to be in contact with one of the second clutch plates 132 and slidable. An oil-hydraulic chamber 136 is formed between the clutch drum 133 and the piston 134. Provided between the clutch drum 133 and the piston 134 is a return spring 137, which urges the piston 134 to the direction of reducing the capacity of the oil-hydraulic chamber 136.

In the clutch center 130, a driven gear 139 to which the motive power from the torque converter is transmitted is coupled with the end portion of the protrusion from the clutch drum 133 through the medium of a buffer spring 138. A first one-way clutch 140 to transmit the motive power from the input shaft 50 to the clutch center 130 is provided between the sleeve 135, which is fixed to the input shaft 50, and the clutch center 130, the position of the first one-way clutch 140 being along the input shaft 50 and between the clutch drum 133 and the driven gear 139.

The torque converter 45 is mounted on the front end portion of the crankshaft 19 which protrudes from the crankcase 33 into the front chamber 40. The position of the torque converter 45 is along the axis of the crankshaft 19 and between the front cover 37 and the oil-hydraulic clutch 47. Besides, the spacing between the input shaft 50 of the gearbox 46 and the crankshaft 19 is so determined that part of the oil-hydraulic clutch 47 overlaps the torque converter 45 as seen in the axial direction of the crankshaft 19.

The torque converter 45 is of a known type, comprising a pump 141, a stator 142, and a turbine 143. The pump 141 is fixed onto the crankshaft 19 and connected with the stator 142. A cylindrical stator shaft 144 is journaled coaxially about the crankshaft 19 for free relative rotation therebetween. A cylindrical turbine shaft 145, which the turbine 143 is secured to, is journaled coaxially about the stator shaft 144 for free relative rotation therebetween.

Fixed to the turbine shaft 145 is a driving gear 146, which engages the driven gear 139 coupled with the clutch center 130 of the oil-hydraulic clutch 47.

A second one-way clutch 148, which allows the stator shaft 144 and the stator 142 to rotate in one direction, is provided between a supporting member 147 fixed to the front crankcase half 31 and the stator shaft 144. The driving gear 146 is disposed along the axial direction of the crankshaft 19, between the second one-way clutch 148 and the torque converter 45. Besides, the oil-hydraulic clutch 47 is mounted on the front end portion of the input shaft 50 so that at least part of the clutch drum 133 of the clutch takes a position along the axial direction of the crankshaft 19 and by and adjacent to the second one-way clutch 148.

Provided between the pump 141 of the torque converter 45 and the turbine shaft 145 which the driving gear 146 is fixed to is a third one-way clutch 150 to transmit the motive power from the turbine shaft 145 to the pump 141.

Referring to FIG. 5, the rotor 152 of a generator 151 is fixed onto the rear end portion of the crankshaft 19 which protrudes from the rear crankcase half 32 of the crankcase 33 into the rear chamber 41. The stator 153 of the generator 151 is fixed to the rear cover 39.

A starting gear 154 connected to a starting motor (not shown) is journaled about the crankshaft 19 for free relative rotation therebetween, the position of the starting gear 154 being adjacent to the rotor 152 of the generator 151. The starting gear 154 is connected to the rotor 152 through the medium of a fourth one-way clutch 155. Thus, the starter motor drives the starting gear 154, which drives the crankshaft 19 through the medium of the fourth one-way clutch 155 and the rotor 152. When the engine E is started by cranking, the fourth one-way clutch 155 disengages to isolate the starting gear 154 from the rotor 152.

A starting wheel 156 is fixed to the rear end of the crankshaft 19, and mounted on the rear cover 39 is a recoil starter 157 which has a claw to engage the starting wheel 156. Accordingly, the crankshaft 19 can also be turned by pulling the rope 158 of the recoil starter 157.

A plurality of protrusions 180 is formed on the periphery of the rotor 152. Disposed opposite the protrusions 180 and mounted on the rear cover 39 is an engine-speed sensor 181 which senses the protrusions 180 and determines the revolving speed of the crankshaft 19.

In FIG. 9, a scavenging pump 161 driven by the crankshaft 19 sucks in, through a strainer 160, oil collected in an oil reservoir 159 formed at the bottom of the crankcase 33 and discharges and returns oil to the oil reservoir 159 through an oil cooler 162. A first relief valve 163 is provided between the scavenging pump 161 and the oil cooler 162.

The oil-hydraulic clutch 47 is driven by the actuator 164, which is independent of the electric motor 118 driving the gearbox 46. The actuator 164 has a hydraulic pump 165 driven by the crankshaft 19 and a control valve 166 for controlling the discharge pressure of the hydraulic pump 165 and causing the discharge pressure to act on the oil-hydraulic chamber 136 of the oil-hydraulic clutch 47.

The hydraulic pump 165 sucks in, through the strainer 160, oil collected in the oil reservoir 159 and feeds oil to the control valve 166 for the clutch through a second relief valve 167 and an oil filter 168.

The control valve 166 for the oil-hydraulic clutch 47 comprises a valve housing 171 with an input port 169 and an output port 170, a spool 172 fitted freely slidably into the valve housing 171 to allow and disallow the communication between the input and output ports 169 and 170, a spring 173 provided between the spool 172 and the valve housing 171, and a linear solenoid 174 coaxially connected to the spool 172. The input port 169 is connected to the oil filter 168, and the output port 170 is connected to the oil-hydraulic chamber 136 of the oil-hydraulic clutch 47.

The valve housing 171 has a through hole 175. The spring 173 is disposed between a cap 176 closing one end of the hole 175 and one end of the spool 172 fitted slidably into the hole 175. The linear solenoid 174 is secured to the valve housing 171 so as to close the other end of the hole 175, and the front end of a rod 174a of the linear solenoid 174 is put into contact with the other end of the spool 172, their axes aligned with each other.

The spring 173 urges the spool 172 to the side where the latter allows the communication between the input and output ports 169 and 170. The thrust exerted by the linear solenoid 174 in accordance with the input current is applied to the spool 172 through the rod 174a to move the spool 172 to the side where the spool 172 disallows the communication between the input and output ports 169 and 170.

Formed between the valve housing 171 and the spool 172 is a pressure chamber 176 in the shape of a ring which the pressure of the output port 170 acts on. The area of the pressure-receiving surface of the spool 172 on the linear solenoid 174's side of the pressure chamber 176 is smaller than the area of the pressure-receiving surface of the spool 172 on the spring 173's side of the pressure chamber 176. Therefore, the pressure in the pressure chamber 176 acts on and urges the spool 172 to the side where the spool 172 allows the communication between the input and output ports 169 and 170.

With the control valve 166 for the oil-hydraulic clutch 47, as the input current of the linear solenoid 174 increases, the oil pressure of the hydraulic pump 165 decreases and is outputted from the output port 170.

As shown in FIG. 4, the valve housing 171 of the control valve 166 is disposed in a position nearly corresponding to the position of the oil-hydraulic clutch 47 and mounted on the outer surface of the front cover 37. An oil path 177 communicating with the oil-hydraulic chamber 136 of the oil-hydraulic clutch 47 is formed coaxially in the front end portion of the input shaft 50. An oil path 178 communicating the output port 170 of the control valve 166 is formed in the front cover 37. Provided between the front end portion of the input shaft 50 and the front cover 37 is an oil feed pipe 179 which connects the oil paths 177 and 178. The oil feed pipe 179 is disposed by the torque converter 45 and aligned with the input shaft 50.

An accumulator 183 is connected to the output port 170 of the control valve 166 for the oil-hydraulic clutch 47. The accumulator 183 comprises: a fixed housing 184; an accumulator piston 186 fitted slidably into the housing 184 and forming therebetween a pressure-accumulating chamber 185 which communicates with the output port 170; and a spring 187 provided between the housing 184 and the accumulator piston 186 to exert its force in the direction of increasing the capacity of the pressure-accumulating chamber 185. Formed between the housing 184 and the accumulator piston 186 is a pilot chamber 188, which exerts its force in the direction of reducing the capacity of the pressure-accumulating chamber 185. The pilot chamber 188 is connected through a first orifice 189 to the output port 170 of the control valve 166 for the oil-hydraulic clutch 47.

The accumulator 183 can be used effectively in a vehicle equipped with a power unit of large torque, lessening the fluctuation in the oil pressure due to the control valve 166 and thereby reducing the shock at the time of gear change.

In addition, connected to the output port 170 of the control valve 166 is a valve 190 which opens in accordance with the drop in the oil pressure at the output port 170 to discharge the oil of the oil-hydraulic chamber 136 of the oil-hydraulic clutch 47 to the oil reservoir 159 and thereby allow the oil-hydraulic clutch 47 to disengage promptly.

The exit of the oil filter 168 is connected to the input port 169 of the control valve 166 for the oil-hydraulic clutch 47 and the input port 192 of a control valve 191 for the torque converter 45.

The control valve 191 comprises a valve housing 194 with an input port 192 and an output port 193, a spool 195 fitted freely slidably into the valve housing 194 to allow and disallow the communication between the input and output ports 192 and 193, a spring 196 provided between the valve housing 194 and one end of the spool 195 to urge the spool 195 in the direction of allowing the communication between the input and output ports 192 and 193. Provided between a cap 197 fitted on the valve housing 194 and the other end of the spool 195 is a pilot chamber 198, which exerts oil pressure to urge the spool 195 to the direction of disallowing the communication between the input and output ports 192 and 193. The pilot chamber 198 communicates with the input port 192.

With the above control valve 191 for the torque converter 45, the oil pressure outputted from the hydraulic pump 165 can be controlled at a constant level and outputted from the output port 193 of the control valve 191.

As shown in FIG. 4, the valve housing 194 of the control valve 191 for the torque converter 45 is mounted on such part of the front cover 37 as is nearly positionally corresponding to the crankshaft 19. Formed in the crankshaft 19 is an oil path 199 which communicates with the inside of the torque converter 45. The output port 193 is connected to the oil path 199 through a second orifice 200 in the front cover 37. Besides, an oil path 201 is formed in the crankshaft 19 to lead oil discharged from the torque converter 45 toward a crank pin 35.

Formed in the front cover 37 and the front casing 36 is an oil path 202 which communicates with the output port 193 of the control valve 191 for the torque converter 45. Provided in the oil path 202 is a third orifice 203 which is caught between the front casing 36 and the front cover 37. Besides, the oil path 202 is connected to an oil path (not shown) in the cylinder head 20 through a fourth orifice 204 and also to an oil path 205 in the rear casing 38 (refer to FIG. 5). The oil path 205 is connected through a fifth orifice 207 to an oil path 206 formed in the output shaft 51 of the gearbox 46. The oil in the oil path 202 is fed into the oil-hydraulic clutch 47 through a sixth orifice 208.

A control unit 208 controls the electric motor 118 driving the gearbox 46 and the linear solenoid 174 of the control valve 166 controlling the oil-hydraulic clutch 47 in order to synchronize the engagement and disengagement of the oil-hydraulic clutch 47 to the gear change of the gearbox 46. Inputted in the control unit 208 are: the detection signal of a position detector 210 for detecting the position "L", "D", "N", or "R" of a select lever 209; the on/off signal of a power button 211 for effecting the gear change of the gearbox 46 while the select lever 209 is in the "D" position; the detection signal of a throttle sensor 212 for detecting the opening of the throttle of the engine E; and the detection signals of the shift-position detector 73, the vehicle-speed sensor 83, a rotational phase detection means 129, and the engine-speed sensor 181.

When the select lever 209 is put in the "L" position, the control unit 208 controls the electric motor 118 to put the first-speed gear train G1 of the gearbox 46 into operation. When the select lever 209 is put in the "D" position while the power button 211 is off, the control unit 208 controls the electric motor 118 to put the second-speed gear train G2 of the gearbox 46 into operation. When the select lever 209 is put in the "D" position while the power button 211 is on, the control unit 208 controls the electric motor 118 to put the third-speed gear train G3 of the gearbox 46 into operation. When the select lever 209 is put in the "N" position, the control unit 208 controls the electric motor 118 to put into operation none of the first-, second-, and third-speed and reverse gear trains G1, G2, G3, and GR of the gearbox 46. When the select lever 209 is put in the "R" position, the control unit 208 controls the electric motor 118 to put the reverse gear train GR of the gearbox 46 into operation.

While the select lever 209 is in the position "L", "D", or "R", the control unit 208 controls the linear solenoid 174 to have the oil-hydraulic clutch 47 engage. While the select lever 209 is in the position "N", the control unit 208 controls the linear solenoid 174 to disengage the oil-hydraulic clutch 47.

When the oil-hydraulic clutch 47 is about to be changed from its disengaged state to its engaged state upon the positional change of the select lever 209 among "L", "D", "N", and "R", the control unit 208 controls the input current into the linear solenoid 174, namely, the oil pressure of the oil-hydraulic clutch 47, taking into account the detection signals of the throttle sensor 212, the shift-position detector 73, the speed sensor 83, and the engine-speed sensor 181.

Next, the workings of this first embodiment will be described. The gearbox 46 is driven for gear change by the electric motor 118, whereas the oil-hydraulic clutch 47 is driven by the actuator 164 that is independent of the electric motor 118. Thus, it is not necessary to link mechanically the gearbox 46 and the oil-hydraulic clutch 47. If such a gearbox and a clutch are mechanically linked together, the link mechanism has to be increased in rigidity as the displacement volume of the engine increases and hence the load on the clutch increases. The increase of the rigidity of the link mechanism entails the increase of its weight. Having no such link mechanism, the gearbox 46 and the oil-hydraulic clutch 47 of the present embodiment is free from such weight increase. In addition, because the load on the oil-hydraulic clutch 47 does not affect the gear-changing load or stroke of the gearbox 46, gear change can be made smoothly.

Besides, because: the gearbox 46 has the input shaft 50 that is journaled in the crankcase 33; the oil-hydraulic clutch 47 is mounted on the front end portion of the input shaft 50 that protrudes from the crankcase 33; and the control valve 166 constituting a part of the actuator 164 is mounted on the front cover 37 that covers the oil-hydraulic clutch 47 and the torque converter 45 and is joined to the crankcase 33, the oil-hydraulic clutch 47 and the control valve 166 can be arranged close to each other and, thereby, an excellent responsiveness of the oil-hydraulic clutch 47 to the workings of the control valve 166 can be achieved.

Moreover, the torque converter 45 is mounted on the front end portion of the crankshaft 19 and mounted on the front cover 37 is the control valve 191 for controlling the oil pressure that acts on the torque converter 45. Thus, both the control valves 166 and 191 are mounted on the front cover 37. Therefore, the inspection of oil leakage from both the control valves 166 and 191 can be made on the side of the front cover 37, which contributes to the improvement of productivity.

Furthermore, because the control valve 166 controls the output oil pressure of the output port 170 communicating with the oil-hydraulic chamber 136 of the oil-hydraulic clutch 47 so that the output oil pressure corresponds to the current inputted into the linear solenoid 174, the oil pressure acting on the oil-hydraulic clutch 47 can be controlled by controlling the current inputted into the linear solenoid 174. Therefore, the operating characteristic of the oil-hydraulic clutch 47 can be changed by controlling the oil pressure acting it. Accordingly, the wear of the first and second clutch plates 131 and 132 can be compensated for by changing the operating characteristic of the oil-hydraulic clutch 47. Thus, the oil-hydraulic clutch 47 does not require an adjusting mechanism for the wear of the clutch plates.

In addition, the operation of the linear solenoid 174 of the control valve 166 and that of the electric motor 118 are controlled by the control unit 208. Thus, the control valve 166 and the electric motor 118 are both electrically controlled to: make it easy to synchronize the disengagement and engagement of the oil-hydraulic clutch 47 with the gear change of the gearbox 46; have the oil-hydraulic clutch 47 disengage and engage automatically in synchronization with the electric motor 118 driving the gearbox 46 for gear change; and change the operating characteristic of the oil-hydraulic clutch 47 to reduce the shock at the time of gear change.

Besides, because the oil-hydraulic clutch 47 is separated from the torque converter 45 along the axial direction of the crankshaft 19 and so mounted on the front end portion of the input shaft 50 that part of the oil-hydraulic clutch 47 overlaps the torque converter 45 as seen in the axial direction of the crankshaft 19, the motive-power transmission device of the present invention wherein the gearbox 46 is accommodated in the crankcase 33 is made compact in the axial direction of the crankshaft 19. The motive-power transmission device is also made compact in the direction orthogonal to the axis of the crankshaft 19 by disposing the oil-hydraulic clutch 47 close to the crankshaft 19.

The oil feed pipe 179, which extends by the torque converter 45, coaxially with the input shaft 50, is provided between the front end of the input shaft 50 and the front cover 37 which is joined to the crankcase 33 to cover the torque converter 45 and the oil-hydraulic clutch 47. Thus, the space by the torque converter 45 is made use of to constitute the hydraulic-oil feed system for the oil-hydraulic clutch 47.

The oil-hydraulic clutch 47 comprises: the clutch center 130 which the driven gear 139 is coupled with; the plurality of first clutch plates 131 engaging the outer periphery of the clutch center 130 so as to prohibit the relative rotation between themselves and the clutch center 130; the plurality of second clutch plates 132 disposed alternately with the first clutch plates 131; the clutch drum 133 accommodating the first and second clutch plates 131 and 132, engaging the outer peripheries of the second clutch plates 132 so as to prohibit the relative rotation between itself and the plates, and rotating with the input shaft 50 as a unit; and the piston 134 fitted in the clutch drum 133 so as to be freely slidable to cause frictional engagement between the first and second clutch plates 131 and 132. Thus, the oil-hydraulic clutch 47 having the relatively large clutch drum 133 can effectively be disposed along the axis of the crankshaft 19, near the torque converter 45, without causing the driven gear 139 and the clutch drum 133 to interfere with the crankshaft 19.

Moreover, because provided between the clutch center 130 and the input shaft 50 is the first one-way clutch 140 to transmit the motive power from the latter to the former, the motive power of the gearbox 46 is transmitted to the torque converter 45 when the engine brake is applied. In addition, the motive power of the gearbox 46 is transmitted by the third one-way clutch 150 to the crankshaft 19, going around the torque converter 45 when the engine brake is applied.

Furthermore,: the second one-way clutch 148 to allow the stator 142 of the torque converter 45 to rotate in one direction is provided between the stator 142 and the crankcase 33; the driving gear 146 which rotates as a unit with the turbine 143 of the torque converter 45 is disposed between the second one-way clutch 148 and the torque converter 45, along the axial direction of the crankshaft 19; and the oil-hydraulic clutch 47 is mounted on the front end portion of the input shaft 50 so that at least part of the clutch drum 133 takes a position along the axial direction of the crankshaft 19 and by and adjacent to the second one-way clutch 148. Therefore, the efficiency of the torque converter 45 can be improved by having the second one-way clutch 148 allow the stator 142 to rotate idly. Besides, the second one-way clutch 148 with a relatively small diameter can effectively be disposed in the space between the clutch drum 133 and the crankshaft 19, positionally corresponding to at least part of the clutch drum 133.

Figure 10:
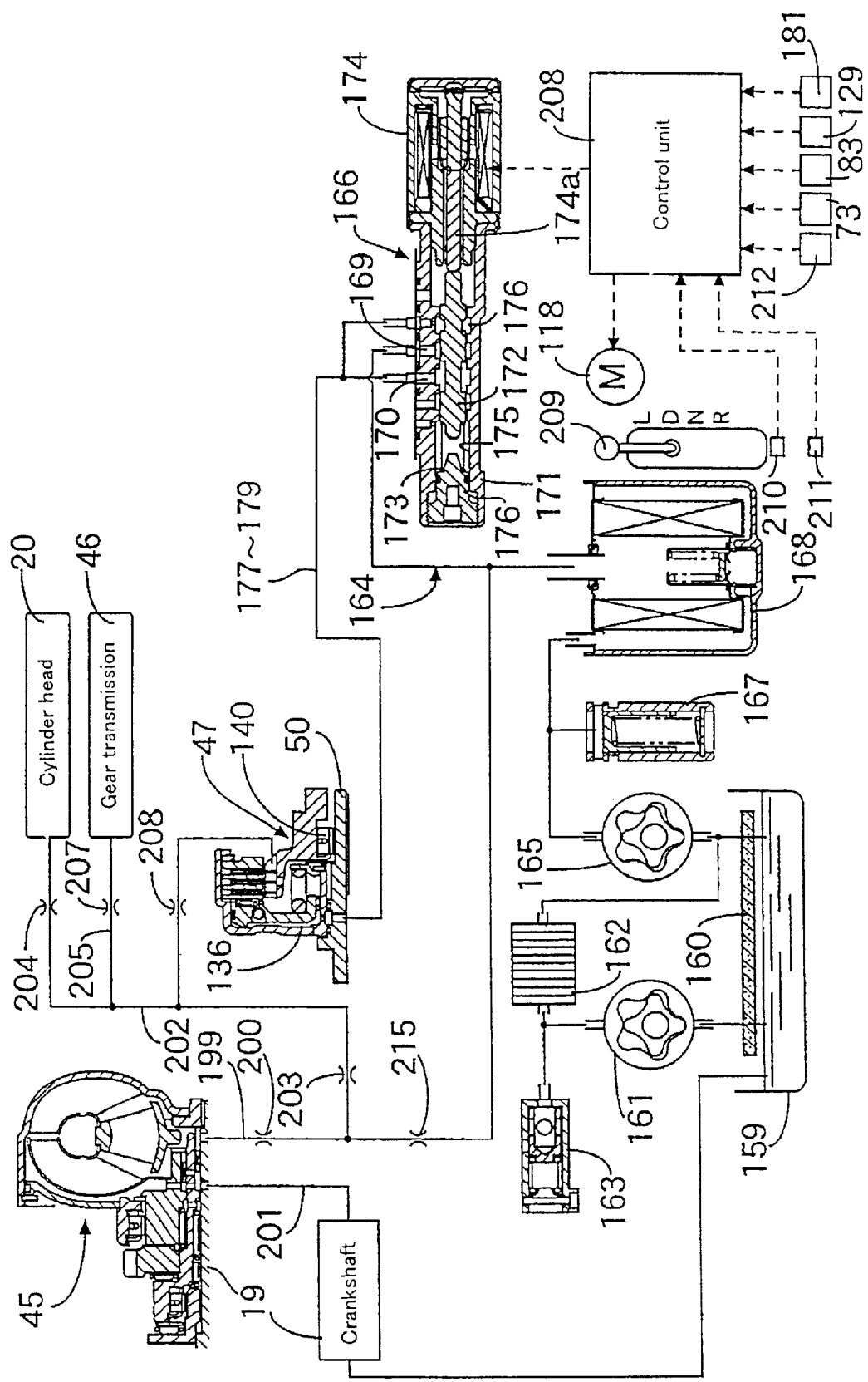
FIG. 10 is an oil-hydraulic circuit of the power unit of the second embodiment of the present invention.

FIG. 10 shows the second embodiment of the present invention. The accumulator 183 and the valve 150 of the first embodiment can be omitted in the case of vehicles of which power units produce relatively small torque. Besides, a sixth orifice 215 can be used instead of the control valve 191.

The embodiments of the present invention has been described above in detail. The present invention is, however, not to be limited to the above embodiments and various changes of design can be made without departing from the present invention described in claims.

For example, the present invention can be applied not only to motive-power transmission devices for all terrain vehicles of the saddle type but also those for general vehicles each comprising a torque converter, a gearbox wherein one gear train is chosen and put into operation, and a clutch to cut off the transmission of motive power between the input shaft of the gearbox and the turbine of the torque converter.

Moreover, although the oil-hydraulic clutch 47 is mounted on the front end portion of the input shaft 50 and the torque converter 45 is mounted on the front end portion of the crankshaft 19, the present invention is also applicable to a motive-power transmission device wherein a clutch 47 is mounted on the rear end portion of an input shaft 50 lying in the longitudinal direction of the vehicle and a torque converter 45 is mounted on the rear end portion of a crankshaft 19 lying in the direction.

According to the first aspect of the present invention, a motive-power transmission device wherein the gearbox is accommodated in the crankcase can be made compact in the axial direction of the crankshaft. Besides, as the clutch can be disposed close to the crankshaft, the motive-power transmission device can be made compact in the direction orthogonal to the axis of the crankshaft.

According to the second aspect of the present invention, in the motive-power transmission device in accordance with the first aspect of the present invention, a space by the torque converter is made use of to constitute the hydraulic-oil feed system for the clutch.

According to the third aspect of the present invention, in the motive-power transmission device in accordance with the second aspect of the present invention, the clutch and a control valve for the clutch can be arranged close to each other and, thereby, excellent responsiveness of the clutch to the workings of the control valve can be achieved.

According to the fourth aspect of the present invention, in the motive-power transmission device in accordance with the second or third aspects of the present invention, the clutch having a relatively large clutch drum can effectively be disposed along the axis of the crankshaft, near the torque converter, without causing the clutch drum to interfere with the crankshaft.

According to the fifth aspect of the present invention, in the motive-power transmission device in accordance with the fourth aspect of the present invention, the motive power of the gearbox can be transmitted to the torque converter when the engine brake is applied.

According to the sixth aspect of the present invention, in the motive-power transmission device in accordance with the fourth or fifth aspects of the present invention, the efficiency of the torque converter can be improved by having a second one-way clutch allow the stator to rotate idly. Besides, the second one-way clutch with a relatively small diameter can effectively be disposed in the space between the clutch drum and the crankshaft, positionally corresponding to at least part of the clutch drum.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A motive-power transmission device for a vehicle, the vehicle including a torque converter having a pump which rotates as a unit with an engine crankshaft, a gearbox wherein one of a plurality of gear trains is selectable and put into operation, and a clutch for cutting off the transmission of motive power between an input shaft of the gearbox and a turbine of the torque converter, said motive-power transmission device comprising:

said crankshaft and said input shaft are journaled freely rotatably in a crankcase of the engine, axes of said crankshaft and said input shaft being parallel to each other;

said torque converter is mounted on one end portion of said crankshaft; and said clutch is separated in an axial direction of said crankshaft from said torque converter and is mounted on one end portion of said input shaft such that part of said clutch overlaps said torque converter as seen in the axial direction of said crankshaft.

2. The motive-power transmission device for a vehicle as claimed in claim 1, further comprising:

said one end portion of said crankshaft on which said torque converter is mounted protrudes from said crankcase;

said one end portion of said input shaft on which said clutch is mounted protrudes from said crankcase, said clutch being operated by oil pressure and being disposed between said torque converter and said crankcase; and an oil feed pipe extending coaxially with said input shaft beyond said torque converter, said oil feed pipe for feeding oil to said clutch and being provided between said one end portion of said input shaft and a cover, said cover being for covering said torque converter and said clutch and being joined to said crankcase.

3. The motive-power transmission device for a vehicle as claimed in claim 2, wherein a control valve for said clutch for controlling the oil pressure acting on said clutch is connected to said oil feed pipe and is mounted on said cover.

4. The motive-power transmission device for a vehicle as claimed in claim 2, wherein said clutch comprises:

a clutch center coupled with a driven gear and rotatable about the axis of said input shaft, said driven gear engaging a driving gear which rotates as a unit with said turbine of said torque converter;

at least one first clutch plate which engages an outer periphery of said clutch center to prohibit relative rotation between said first plate and said clutch center;

at least one second clutch plate which is disposed to overlap said first clutch plate;

a clutch drum which accommodates said first and second clutch plates, engages an outer periphery of said second clutch plate to prohibit the relative rotation between said clutch drum and said second clutch plate, said clutch drum rotating with said input shaft as a unit; and a piston fitted in said clutch drum freely slidable to cause frictional engagement between said first and second clutch plates.

5. The motive-power transmission device for a vehicle as claimed in claim 3, wherein the clutch comprises:

a clutch center coupled with a driven gear and rotatable about the axis of said input shaft, said driven gear engaging a driving gear which rotates as a unit with said turbine of said torque converter;

at least one first clutch plate which engages an outer periphery of said clutch center to prohibit relative rotation between said first plate and said clutch center;

at least one second clutch plate which is disposed to overlap said first clutch plate;

a clutch drum which accommodates said first and second clutch plates, engages an outer periphery of said second clutch plate to prohibit the relative rotation between said clutch drum and said second clutch plate, said clutch drum rotating with said input shaft as a unit; and a piston fitted in said clutch drum freely slidable to cause frictional engagement between said first and second clutch plates.

6. The motive-power transmission device for a vehicle as claimed in claim 4, wherein a first one-way clutch for transmitting the motive power from said input shaft to said clutch center is provided between said clutch center and said input shaft.

7. The motive-power transmission device for a vehicle as claimed in claim 5, wherein a first one-way clutch for transmitting the motive power from said input shaft to said clutch center is provided between said clutch center and said input shaft.

8. The motive-power transmission device for a vehicle as claimed in claim 4, wherein:

a second one-way clutch for allowing a stator of said torque converter to rotate in one direction is provided between said stator and said crankshaft;

said driving gear is disposed between said second one-way clutch and said torque converter, along the axial direction of said crankshaft; and said clutch is mounted on said one end portion of said input shaft so that at least a part of the clutch drum is located along the axial direction of said crankshaft to overlap the second one-way clutch in the axial direction of said crankshaft.

9. The motive-power transmission device for a vehicle as claimed in claim 5, wherein:
   a second one-way clutch for allowing a stator of said torque converter to rotate in one direction is provided between said stator and said crankcase;
   said driving gear is disposed between said second one-way clutch and said torque converter, along the axial direction of said crankshaft; and
   said clutch is mounted on said one end portion of said input shaft so that at least a part of the clutch drum is located along the axial direction of said crankshaft to overlap the second one-way clutch in the axial direction of said crankshaft.

10. The motive-power transmission device for a vehicle as claimed in claim 6, wherein:
    a second one-way clutch for allowing a stator of said torque converter to rotate in one direction is provided between said stator and said crankcase;
    said driving gear is disposed between said second one-way clutch and said torque converter, along the axial direction of said crankshaft; and
    said clutch is mounted on said one end portion of said input shaft so that at least a part of the clutch drum is located along the axial direction of said crankshaft to overlap the second one-way clutch in the axial direction of said crankshaft.

11. The motive-power transmission device for a vehicle as claimed in claim 7, wherein:
    a second one-way clutch for allowing a stator of said torque converter to rotate in one direction is provided between said stator and said crankcase;
    said driving gear is disposed between said second one-way clutch and said torque converter, along the axial direction of said crankshaft; and
    said clutch is mounted on said one end portion of said input shaft so that at least a part of the clutch drum is located along the axial direction of said crankshaft to overlap the second one-way clutch in the axial direction of said crankshaft.

12. A motive-power transmission device for a vehicle, comprising:
    a crankshaft and an input shaft journaled freely rotatably in a crankcase of an engine, axes of said crankshaft and said input shaft being parallel to each other;
    a torque converter mounted on one end portion of said crankshaft; and
    a clutch separated in an axial direction of said crankshaft from said torque converter and mounted on one end portion of said input shaft such that part of said clutch overlaps said torque converter as seen in the axial direction of said crankshaft.

13. The motive-power transmission device for a vehicle as claimed in claim 12, further comprising:
    said one end portion of said crankshaft on which said torque converter is mounted protrudes from said crankcase;
    said one end portion of said input shaft on which said clutch is mounted protrudes from said crankcase, said clutch being operated by oil pressure and being disposed between said torque converter and said crankcase; and
    an oil feed pipe extending coaxially with said input shaft beyond said torque converter, said oil feed pipe for feeding oil to said clutch and being provided between said one end portion of said input shaft and a cover, said cover being for covering said torque converter and said clutch and being joined to said crankcase.

14. The motive-power transmission device for a vehicle as claimed in claim 13, wherein a control valve for said clutch for controlling the oil pressure acting on said clutch is connected to said oil feed pipe and is mounted on said cover.

15. The motive-power transmission device for a vehicle as claimed in claim 13, wherein said clutch comprises:
    a clutch center coupled with a driven gear and rotatable about the axis of said input shaft, said driven gear engaging a driving gear which rotates as a unit with a turbine of said torque converter;
    at least one first clutch plate which engages an outer periphery of said clutch center to prohibit relative rotation between said first plate and said clutch center;
    at least one second clutch plate which is disposed to overlap said first clutch plate;
    a clutch drum which accommodates said first and second clutch plates, engages an outer periphery of said second clutch plate to prohibit the relative rotation between said clutch drum and said second clutch plate, said clutch drum rotating with said input shaft as a unit; and
    a piston fitted in said clutch drum freely slidably to cause frictional engagement between said first and second clutch plates.

16. The motive-power transmission device for a vehicle as claimed in claim 14, wherein said clutch comprises:
    a clutch center coupled with a driven gear and rotatable about the axis of said input shaft, said driven gear engaging a driving gear which rotates as a unit with a turbine of said torque converter;
    at least one first clutch plate which engages an outer periphery of said clutch center to prohibit relative rotation between said first plate and said clutch center;
    at least one second clutch plate which is disposed to overlap said first clutch plate;
    a clutch drum which accommodates said first and second clutch plates, engages an outer periphery of said second clutch plate to prohibit the relative rotation between said clutch drum and said second clutch plate, said clutch drum rotating with said input shaft as a unit; and
    a piston fitted in said clutch drum freely slidably to cause frictional engagement between said first and second clutch plates.

17. The motive-power transmission device for a vehicle as claimed in claim 15, wherein a first one-way clutch for transmitting the motive power from said input shaft to said clutch center is provided between said clutch center and said input shaft.

18. The motive-power transmission device for a vehicle as claimed in claim 16, wherein a first one-way clutch for transmitting the motive power from said input shaft to said clutch center is provided between said clutch center and said input shaft.

19. The motive-power transmission device for a vehicle as claimed in claim 15, wherein:
    a second one-way clutch for allowing a stator of said torque converter to rotate in one direction is provided between said stator and said crankcase;
    said driving gear is disposed between said second one-way clutch and said torque converter, along the axial direction of said crankshaft; and said clutch is mounted on said one end portion of said input shaft so that at least a part of the clutch drum is located along the axial direction of said crankshaft to overlap the second one-way clutch in the axial direction of said crankshaft.

20. The motive-power transmission device for a vehicle as claimed in claim 16, wherein:

a second one-way clutch for allowing a stator of said torque converter to rotate in one direction is provided between said stator and said crankcase;

said driving gear is disposed between said second one-way clutch and said torque converter, along the axial direction of said crankshaft; and said clutch is mounted on said one end portion of said input shaft so that at least a part of the clutch drum is located along the axial direction of said crankshaft to overlap the second one-way clutch in the axial direction of said crankshaft.

21. The motive-power transmission device for a vehicle as claimed in claim 17, wherein:

a second one-way clutch for allowing a stator of said torque converter to rotate in one direction is provided between said stator and said crankcase;

said driving gear is disposed between said second one-way clutch and said torque converter, along the axial direction of said crankshaft; and said clutch is mounted on said one end portion of said input shaft so that at least a part of the clutch drum is located along the axial direction of said crankshaft to overlap the second one-way clutch in the axial direction of said crankshaft.

22. The motive-power transmission device for a vehicle as claimed in claim 18, wherein:

a second one-way clutch for allowing a stator of said torque converter to rotate in one direction is provided between said stator and said crankcase;

said driving gear is disposed between said second one-way clutch and said torque converter, along the axial direction of said crankshaft; and said clutch is mounted on said one end portion of said input shaft so that at least a part of the clutch drum is located along the axial direction of said crankshaft to overlap the second one-way clutch in the axial direction of said crankshaft.

* * * * *